P. J. MARKS.
PHOTOGRAPHIC SHUTTER.
APPLICATION FILED AUG. 31, 1908.
932,485.
Patented Aug. 31, 1909.
2 SHEETS—SHEET 1.
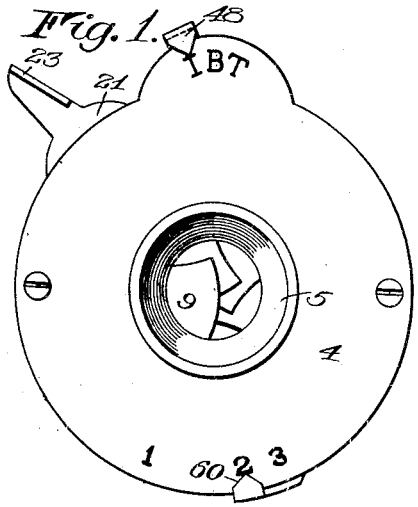
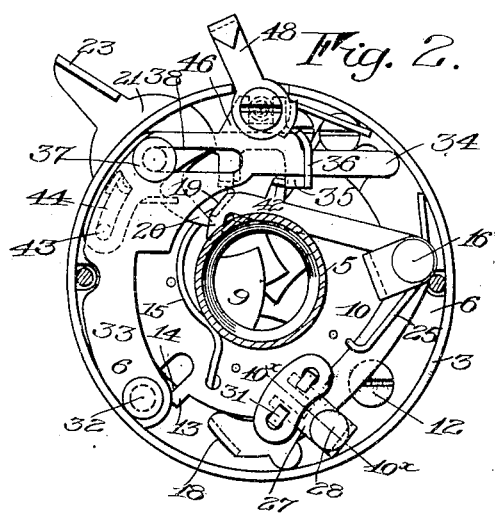
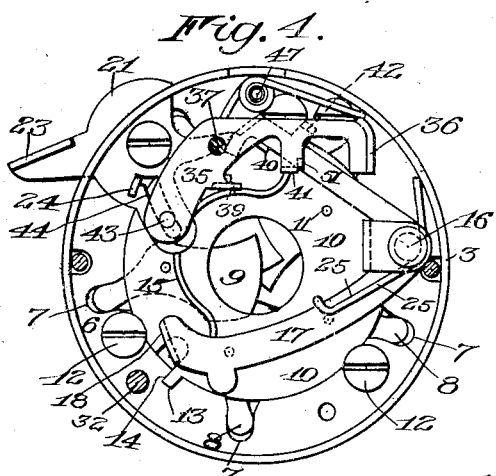
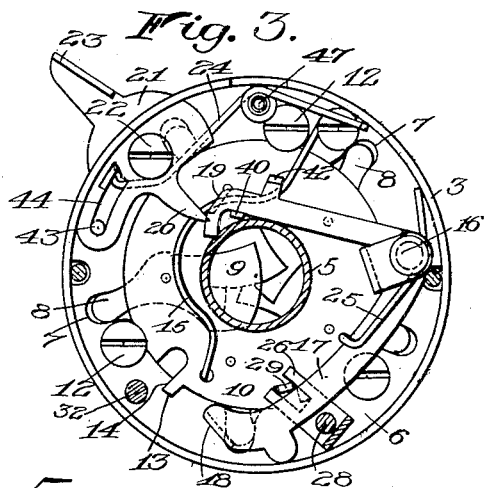
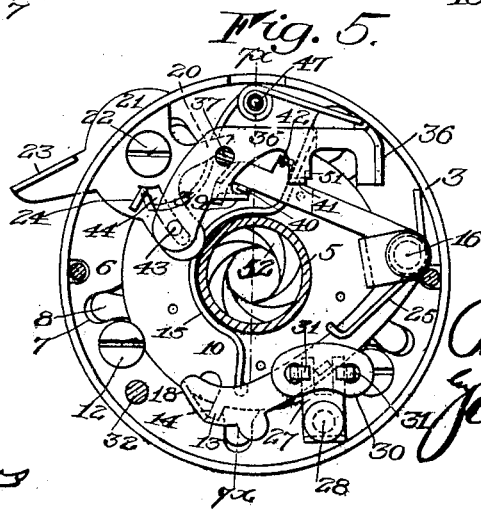

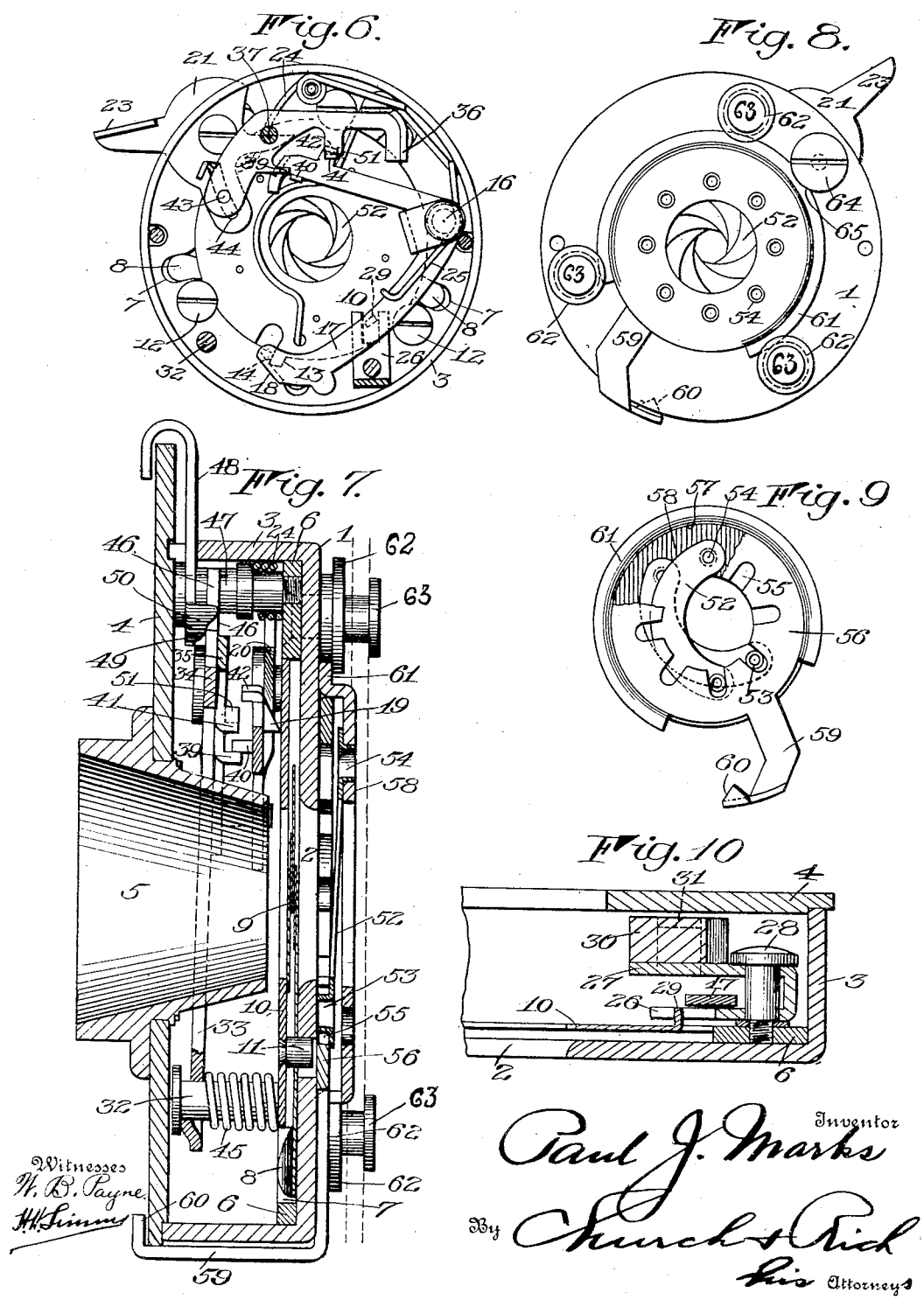

UNITED STATES PATENT OFFICE.

PAUL J. MARKS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

932,485.  Specification of Letters Patent.  Patented Aug. 31, 1909.

Application filed August 31, 1908. Serial No. 451,042.

*To all whom it may concern:*

Be it known that I, PAUL J. MARKS, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to shutters for photographic cameras such as embody a plurality of pivoted overlapping leaves or blades, and it has for its object to provide a suitable operating mechanism therefor whereby the leaves may be operated for making either time, bulb or instantaneous exposures.

My invention also has for its object the arrangement of parts whereby the shutter may be made diminutive in size and to provide in connection with such a shutter means for governing the movement of the blade controlling devices to enable proper exposure to be made under all conditions.

Another object of my invention is to provide an iris diaphragm which is adapted to be arranged exteriorly of the shutter casing and to lie between the latter and the usual lens board or support on which the shutter is mounted.

To these and other ends the invention consists in certain improvements and combinations of parts, all as will be hereinafter more fully described, the novel features being pointed out in the claims at the end of the specification.

In the drawings: Figure 1 is a front elevation of a camera shutter embodying my invention. Fig. 2 is a similar view thereof with the cover or front of the casing removed, showing the parts in normal position. Fig. 3 is also a front elevation showing in detail the master member, and the actuating device therefor. Fig. 4 is a view showing the master member in actuated position and the time and bulb stops adapted to coöperate therewith, the support for said stops being omitted to more clearly illustrate the underlying parts. Fig. 5 is a view similar to Fig. 4 showing the master member in the position in which it is temporarily arrested by the bulb stop. Fig. 6 is a view corresponding to Figs. 4 and 5 showing the master member arrested by the time stop. Fig. 7 is an enlarged sectional view taken on the line $7^\times$—$7^\times$ of Fig. 5. Fig. 8 is a rear view of the shutter casing. Fig. 9 is a detail plan view showing the parts of the diaphragm removed from the shutter casing, and Fig. 10 is an enlarged detail sectional view of the governor taken on the line $10^\times$—$10^\times$ of Fig. 2.

Similar reference numerals in the several figures indicate similar parts.

A camera shutter embodying my invention is arranged within a circular casing embodying the bottom 1, provided with a central aperture 2, and surrounded by a flange or rim 3 on which is fitted a cover or closure 4 provided with a central aperture, in alinement with the aperture 2, in which is secured a tubular sleeve 5.

Within the casing on the bottom 1 thereof is a stationary ring 6 provided with a plurality of notches 7 the sides of which form shoulders between which loosely rest the outer ends 8 of the shutter blades 9, their thin inner ends overlapping to normally close the aperture 2. Arranged within the ring 6 is an operating or controlling member 10 carrying pins 11 extending through each of the leaves to rotate the latter upon their pivots, to open or close the lens aperture when the ring or controlling member is turned in one direction or the other. The member 10 is held in position within the ring 6 by the heads of screws 12, and at one side it is provided with a shoulder 13, extending over the ring 6 and having an end or abutment 14 with which a master member is adapted to engage, as will be further described. The member is normally operated by a spring 15, in a direction to move the leaves so that the shutter aperture is closed, as shown particularly in Fig. 2. Pivoted upon a screw or stud 16 is a master member 17, provided with a lip or shoulder 18, adapted to coöperate with the abutment 14 on the member 10. At its opposite end the master member is provided, upon its rear side, with a small latch projection 19 with which coöperates the end 20 of a pivoted actuating device 21, journaled upon a screw or stud 22, having the operating end or finger piece 23 projecting exteriorly of the casing, which is normally operated in one direction by a coil spring wrapped around a stud and having the end 24 engaging said actuating device. The master member is normally operated into the position, shown in Figs. 2 to 6 by means of a spring 25, and connected to the member is a governor which is pivotally mounted and is swung from one side of its center of movement to the other with each oscillation of the controlling member to govern the movement of the latter both in opening and closing the blades.

The governor, illustrated in detail in Fig. 6, comprises a U shape body having the outer and inner overlapping legs 26 and 27 through which passes the pivot stud 28. The extremity of the lower portion 26 of the body is slotted, as shown in Fig. 3, and the side portions thus formed embrace an outwardly extending projection 29 on the edge of the member 10 which causes the governor to be rotated from its normal position, shown in Figs. 2 and 3, to that illustrated in Figs. 5 and 6 during the operating movement of the blades. The governor is arranged at one side of the center line of the shutter and its pivotal point is so located relatively to the arc described by the movement of the projection 29 that the legs 26 and 27 will be rotated into a substantially vertical position as the member 10 approaches the limit of its movement in opening the blades. From this arrangement of the parts, it will be seen that the governor, hanging at one side of its pivot, acting under the influence of gravity tends to yieldingly retard the opening movement of the blades at the instant the member 10 commences to move, but as the latter approaches the limit of its movement the governor approaches a vertical position so that little if any power is required to overcome its weight and the power of its resistance is decreased during the opening movement of the blades. The governor standing in a substantially vertical position and preferably slightly to one side of its pivot offers no resistance to the movement of the controlling member 10 when operating to close the shutter blades, but, on the contrary, assists in the movement of the member in this direction permitting the blades to be closed with great rapidity. The governor may be made as heavy as desired to control the movement of the member 10 by increasing the size or thickness of the legs forming the body portion, but I prefer to attach to one of the legs thereof, a weight such as 30 which may be adjusted as conditions may require, and to this end I provide the outer leg 27 with ears 31 by means of which the weight may be detachably secured thereon.

The desirability of a retarding device in a shutter of this kind will be apparent when it is taken into consideration that in order to insure a proper operation of the parts, it is desirable to make the motor spring 25 of sufficient strength to operate the shutter blades under all conditions and to afford a positive opening of the blades against the tension of the spring 15. Owing to the minuteness of the parts and their light weight, such a spring is liable to cause too rapid an operation of the blades when the parts of the shutter are set for making the so-called instantaneous exposures, consequently it has been found desirable to regulate the speed of shutters designed to be sold in the open market and used by the public at large by the retarding governing device so that instantaneous exposures under ordinary conditions of light will not produce under-exposed negatives.

Mounted upon a stud 32 is an arm or support 33 having an outer end 34, forming a guide on which is carried a reciprocatory member 35, held in position thereon by a loop 36 passing over the arm 34 and a headed stud 37 operating through an elongated aperture 38 in said arm. The member 35 is provided with a bulb stop 39 adapted to coöperate with a projection 40, on the master member and it also has a time stop 41 coöperating with a projection 42 on the master member. The reciprocatory member 35 also carries a pin 43 which extends into an elongated aperture 44 formed in an arm of the actuating member 21 as shown in Figs. 2, 7 and 3. The projections 39 and 41 extend outwardly from the member 35 and are of different lengths, the former being slightly greater in width than the latter, so that they only engage with their respective bulb and time stop projections 40 and 42 when they are adjusted transversely of the path of movement of said projections and are in operative alinement therewith. The stud 32 is surrounded by a spring 45 which bears against the lower side of the arm or support 33 and the latter is primarily adjusted by means of the screw 32 and is normally moved outwardly by the spring 45 to hold the stop projections on the reciprocatory member 35 out of coöperative position with the projections on the master member. The arm 33 is also provided near its free end with a slot forming two fingers 46 straddling a stud 47 on which is pivoted the exposure controlling lever 48 having two cam shoulders 49 and 50 extending downwardly from its inner end and coöperating with the edge of the arm. The outer end of the lever, projecting exteriorly of the casing, has its extremity formed as an index finger coöperating with the letters I, B and T, appearing upon an outwardly curved extension on the upper edge of the front plate or cover 4, and indicating the respective positions of the lever for instantaneous, bulb, or time exposures.

To make a bulb exposure, the operator first adjusts the lever 48 so that the guide 34 supports the reciprocatory member 35 in position to carry its projection 39 into the path of the projection 40 when the master member is released, as shown in Fig. 5, in which position it will be held and the movement of the master member arrested as long as the actuating device is held in the operated position shown in Fig. 5, the closing of the blades being prevented by the abutment 14 engaging the shoulder 18 on the master member. Upon releasing the actuating device it will be returned to its normal position by the action of the spring 24, causing the projection 39 to be retracted and the master member released, which in turn releases the member 10 allowing the shutter blades to be closed.

In making a time exposure the master member is arrested by the conjoint operation of the time and bulb stop projections coöperating with their respective projections on the master member, when the guide 34 is moved inwardly by the engagement of the cam step 50 with the arm 33. Then the movement of the actuating device 21 sets the master member and moves the reciprocatory member 35 inwardly, to the position shown in Fig. 4, and when the master member is released it is first caught by the projection 39 and subsequently arrested by the stop 41 which is moved in front of the projection 42, prior to the disengagement of the projections 39 and 40. During this part of the operation the reciprocatory member 35 has been moved slightly in a direction toward its normal position by the action of the spring 24, but in order to hold the shutter blades open for an indefinite length of time the complete return movement of the member 35 is prevented by a small shoulder 51, at the outer side of the stop 41, which engages with the side of the projection 42 to hold the parts as shown in Fig. 6, permitting the master member to be released only when the member 35 is again moved inwardly by a second or subsequent movement of the actuating device 21.

In order to regulate the size of the lens aperture I provide an adjustable diaphragm and for the purpose of simplifying the construction and arrangement of the parts thereof I locate them exteriorly of the casing and mount them upon the rear wall thereof where they are hidden from view, when the shutter is mounted on its usual support, but are readily accessible either for removal from or application to said casing.

The diaphragm mechanism, illustrated particularly in Figs. 8 and 9, is of the iris type comprising thin semi-circular overlapping blades 52 each of which is provided at its ends with oppositely extending pivots 53 and 54. The pivots 53 rest in radial slots 55 in a ring plate 56 guided in an annular flange or depression 57 formed in the cap plate 58 provided with perforations in which the pivots 54 of the blades are secured and having a central aperture in alinement with the exposure aperture of the shutter casing. At one side of the cap the flange is cut away to accommodate the movement of an adjusting arm 59 on the ring 56 the outer end of which extends over the rim of the casing its extremity 60 forming an index finger which coöperates with numerals or other index characters arranged on the front or cover 4 of the shutter casing and indicating various sizes of the aperture formed by the blades 52 upon corresponding adjustments of the arm.

The securing of the diaphragm parts to the shutter casing is accomplished in a simple manner by providing the cap plate 58 with a rim 61, which projects laterally in alinement with the face of the adjusting ring 56 and fitting said rim beneath shoulders 62 formed on a plurality of studs 63 which are employed for removably attaching the shutter casing to its support, shown in dotted lines in Fig. 7. It is not essential that these shoulders rigidly engage the rim of the cap and in practice I prefer to fit these parts somewhat loosely to enable the cap with the blades and ring plate located therein to be placed between the studs 63 shifted laterally slightly and revolved a partial revolution to secure its rim beneath the shoulders 62. The cap plate is further secured by a screw 64 the periphery of which fits a curved notch 65 provided in the rim for this purpose and for the further purpose of forming an indentation which with the cut away portion of the rim 61 enables the edge of the cap or cover plate to be passed beyond the shoulders 62 into engagement with the face of the rear wall of the casing when it may be further adjusted as described and secured by the screw 64.

I claim as my invention.

1. In a photographic shutter, the combination with exposure blades and means for operating them to open and close the exposure aperture of the shutter of a governing device controlling the movement of the blades and arranged to yieldingly resist momentarily their opening movement.

2. In a photographic shutter, the combination with exposure blades and means for operating them to open and close the exposure aperture of the shutter of a gravity operated governing device resisting the commencement of the opening movement of the blades, said device being so arranged that its resistance decreases as the opening movement of the blades continues.

3. In a photographic shutter the combination with pivoted exposure blades and a covering device for said blades of a gravity operated device actuated by the controlling member for governing the movement of the blades by yieldingly opposing their opening movement.

4. In a photographic shutter the combination with pivoted exposure blades of a centrally disposed member for opening said blades and a depending piece pivotally connected therewith 5. In a photographic shutter the combination with pivoted exposure blades and a controlling member for actuating them, of a governing device pivoted at one side of the controlling member and operatively connected thereto, so as to be oscillated by the movement of the member in opening and closing the blades, said governing device being arranged in depending position at one side of its center of movement when the blades are closed.

6. In a photographic shutter the combination with pivoted exposure blades and a controlling member for actuating them, of a weighted pivoted member normally supported at one side of its pivot and operatively connected to the controlling member and adapted to be adjusted by said member, during the opening movement of the blades, into a substantially vertical position above its pivot.

7. In a photographic shutter the combination with a casing, exposure blades therein and an oscillating member controlling the opening and closing movement of the blades, of a retarding device pivoted within the casing and oscillated on its pivot by the movement of the controlling member.

8. In a photographic shutter the combination with a casing, exposure blades therein and an oscillating member controlling the opening and closing movement of the blades, of a retarding device comprising a body portion pivoted within the casing and adapted to be rocked on its pivot by the movement of the controlling member and a weight supported on said body portion.

9. In a photographic shutter the combination with a casing, exposure blades therein and an oscillating member controlling the opening and closing movement of the blades and a projection on said member, of a retarding device pivoted within the casing and comprising two arms, one of which is free, the other embracing the projection on said member and a weight attached to the free arm.

10. The combination with a shutter casing having a rear wall provided with an exposure aperture and studs thereon for securing the casing to a support, of a cap plate fitted between and secured to the casing by engagement with the studs, adjustable diaphragm leaves and a member for operating them all arranged between the cap plate and casing.

11. The combination with a shutter casing having a rear wall provided with an aperture, diaphragm mechanism comprising adjustable blades for regulating the size of the aperture and devices on said rear wall securing said mechanism thereon and serving also to secure the shutter casing to its support.

12. The combination with a shutter casing having a rear wall provided with an aperture and adjustable overlapping blades for regulating the size of the aperture, of a plate covering said blades having an offset edge extending toward the wall of the casing, a ring for adjusting the blades journaled within said edge and an operating handle on the ring projecting beyond the edge of the casing.

13. The combination with a shutter casing having a rear wall provided with an aperture and adjustable overlapping blades for regulating the size of the aperture, of a plate covering the blades having an offset edge and a laterally extending rim thereon resting against the wall of the casing, studs thereon having shoulders overhanging said rim and a ring for adjusting the blades journaled beneath the plate and having an operating handle projecting outwardly beneath the latter.

PAUL J. MARKS.

Witnesses:
G. WILLARD RICH,
H. H. SIMMS.